United States Patent [19]

Perry, III

[11] Patent Number: 4,696,556

[45] Date of Patent: Sep. 29, 1987

[54] EYEGLASS RETAINER

[76] Inventor: Charles D. Perry, III, 14612 Larch, Lawndale, Calif. 90260

[21] Appl. No.: 731,114

[22] Filed: May 6, 1985

[51] Int. Cl.[4] .......................... G02C 5/14; G02C 3/00
[52] U.S. Cl. ..................................... 351/157; 351/123; 351/156
[58] Field of Search ....................... 351/123, 156, 157; 2/452; 223/40, 41, 42

[56] References Cited

U.S. PATENT DOCUMENTS 2,704,961  3/1955  Weil .................................... 351/157

Primary Examiner—Rodney B. Bovernick
Attorney, Agent, or Firm—Beehler, Pavitt, Siegemund, Jagger, Martella & Dawes

[57] ABSTRACT

The present invention provides an eyeglass retainer headband comprised of a tube of pliable material having two open ends, a tube segment at each end being turned into itself to form a double walled end portion of somewhat reduced inner diameter and increased stiffness while also providing a smoothly contoured or finished edge around each opening of the tube to prevent fraying of the fabric. Although it is presently preferred that the tube be made of a knitted fabric, the invention is not restricted to such material and may extend to other pliable elastic materials.

14 Claims, 5 Drawing Figures

U.S. Patent  Sep. 29, 1987  4,696,556
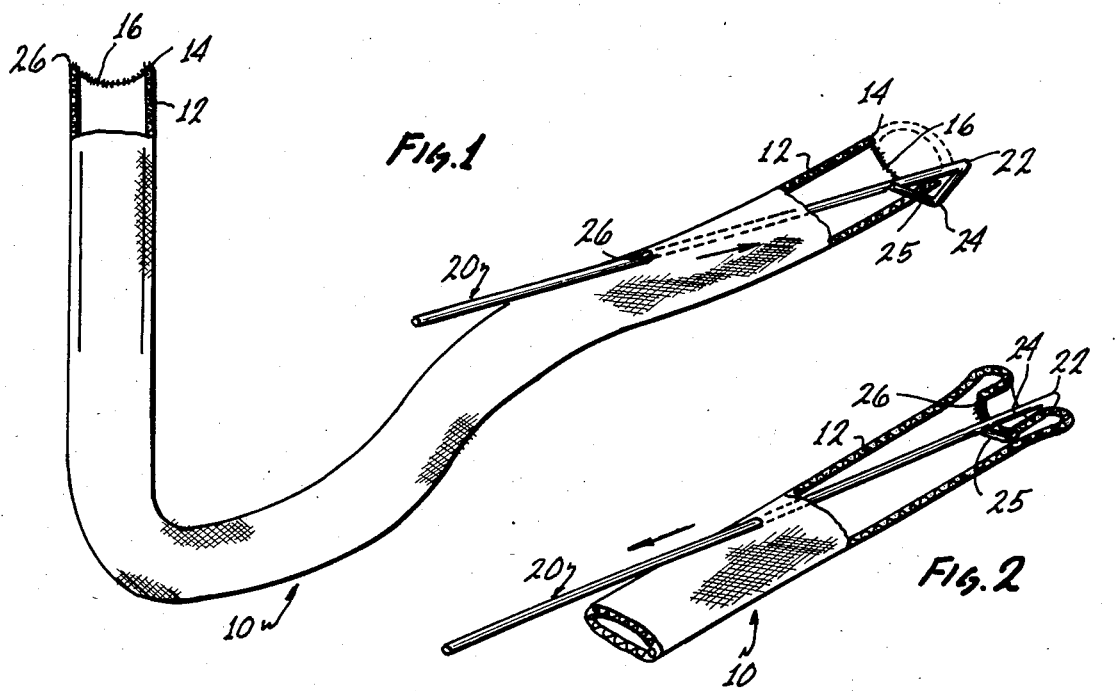
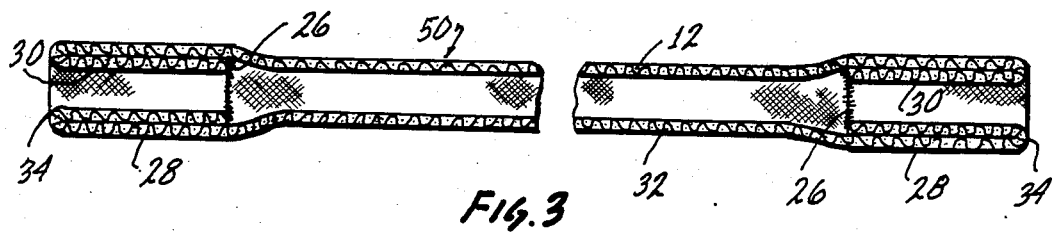
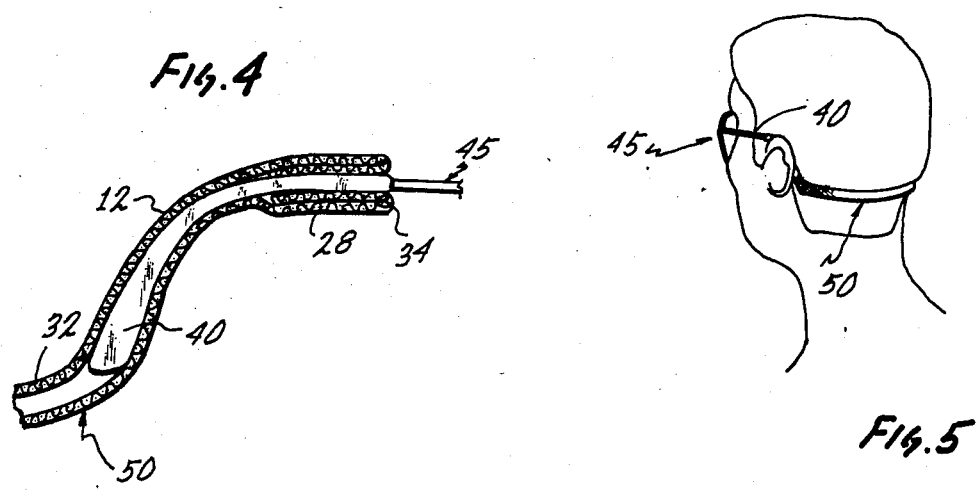

EYEGLASS RETAINER

BACKGROUND OF THE INVENTION

1. Field of the Invention

The present invention relates to the field of eyeglass retainers, and is more particularly directed to an improved retainer which connects the temple pieces of an eyeglass frame around the rear of the head of the eyeglass wearer.

2. State of the Prior Art

A variety of eyeglass retainers are known and in use. Two distinct types are known. One is a retainer designed to allow the wearer to remove his eyeglasses and leave them dangling from his neck. Such retainers are not designed to better secure the eyeglasses in position during use. The second known type of retainers accomplish this latter function and are suited for use during sporting or other activities so as to prevent accidental loss of the eyeglasses.

Of the first type, various retainers are known which consists of a string, band or strap which is provided with attachment means at each end, for example, clips or other fasteners for securing the ends of the retainer to the temple pieces of a pair of eyeglasses. The length of the retainer strap in such cases is sufficiently long to allow the eyeglasses to hang loosely from the person's neck when they are not in position for use. During use, the retainer hangs loosely behind the wearer's head. Exemplary of such retainers are the devices disclosed in U.S. Pat. Nos. 2,481,946 to Pendleton, 2,539,922 to Nyberg, and 2,704,961 to Weil.

Of the other type of eyeglass retainer, one device is disclosed by Fuller in U.S. Pat. No. 4,133,604, which comprises an elastic band provided with tubular ends which slide onto and grip the temple pieces of a pair of eyeglasses. While this device performs adequately, it is constructed by sewing together the edges of an originally flat band of elastic material. Still other eyeglass retainers are disclosed in U.S. Pat. Nos. 3,450,467 to Phillips, 3,502,396 to Greenberg, and 1,819,738 to Daniels.

Seron in U.S. Pat. No. 3,874,776 and Lawrence in U.S. Pat. No. 3,879,804 disclose fasteners for attaching a strap or retainer cord to the frame of a pair of eyeglasses.

Attempts have been made in the past to make eyeglass retainers from tubing made of textile fabric, particularly small diameter tubes made of knitted elastic fiber, known as draw cord in the knitting industry. In general, such a retainer is constructed by cutting a length of said cord or tubing to an appropriate length, and inserting one of the temple pieces of the eyeglass frame into each of the open ends of the tube. The diameter of the tube is selected so as to snuggly slide over and retain the temple pieces of the eyeglass within the tube. Two problems have been encountered in the past with such devices. Firstly, unless the ends of the textile tube are terminated or finished in some way, the fabric will increasingly fray with use, such that the ends of the tube will lose their tubular structure and elasticity and eventually become inadequate for securely retaining the temple pieces of the eyeglass frame. A further problem encountered in the past has been the need to provide adequate gripping force of the tube about the eyeglass temple piece or bow while maintaining ease of attachment of the retainer to the tube. This latter difficulty has been aggravated in some cases because of the insufficient elasticity of the knitted fabric used, which is thus unable to securely grip the eyeglass temple piece.

Solutions have been restored to in the past to overcome these two problems have included dipping the ends of the textile tube in a liquid, such as an adhesive, which hardens upon drying so as to increase the stiffness of the ends of the retainer tube against stretching or bending, thereby improving its gripping or retaining capabilities about the temple piece. The adhesive also tends to keep the unfinished ends of the knitted tube against excessive fraying, but does not stop completely the fraying process. Such eyeglass retainers tend to be unsightly, and do not perform adequately or reliably since after a period of use the rubber adhesive typically used for dipping the tube ends cracks and is no longer able to reinforce the tube as intended.

Another expedient adopted in the past has been the use of short lengths of rubber tubing, such as surgical tubing, inserted into or otherwise attached to each end of the knitted tube, as exemplified by the above refernced patents to Weil and Pendleton. Although this is a more reliable solution to the problem, it substantially raises the cost of manufacture of the device since additional materials are required, and also additional labor is necessary to insert and secure the surgical tubing within the knitted tube.

Thus, a continuing need exists for improvements in eyeglass retainers made of knitted fabric.

SUMMARY OF THE INVENTION

The present invention overcomes these and other shortcomings of the prior art by providing an eyeglass retainer headband comprised of a tube of pliable material having two open ends, a tube segment at each end being turned into itself to form a double walled end portion of somewhat reduced inner diameter and increased stiffness while also providing a smoothly contoured or finished edge around each end opening of the tube to prevent fraying of the fabric. Although it is presently preferred that the tube be made of a knitted fabric, the invention is not restricted to such material and may extend to other pliable, elastic materials.

Best results according to this invention are obtained when the wall thicknesss of the tube is substantial in relation to the internal radius of the tube, so that when the ends of the tube are inturned, a substantial thickening of the tube ends occurs with an attendant reduction in the internal diameter of the end opening, both of which assist in the more effective gripping of the temple pieces of a pair of eyeglasses. The inner diameter of the tube is selected such that the reduced inner diameter of the end portions after inturning of the end segments is sized to snuggly accept the temple pieces of a pair of eyeglasses, and the length of the tube is such as to exert elastic retaining force for holding the eyeglasses in position on the head of the wearer, when the retainer is worn around the back of the head of an eyeglass wearer and connecting the temple pieces of the eyeglass frame.

A presently preferred manner of folding inwardly each of the end segments of the tube consists of inserting a needle provided with a barb or hook such as a conventional machine knitting needle through the tube wall, hooking one end of the tube with the barb and then retracting the needle to fold and pull the hooked tube end into the tube so as to form end portions of double wall thickness having a somewhat reduced inner diameter and increased stiffness, as well as a smoothly contoured edge about end opening.

BRIEF DESCRIPTION OF THE DRAWINGS

FIG. 1 illustrates a length of tubing with a barbed needle inserted through the tube wall and the barb hooked to one end of the tube.

FIG. 2 illustrates in partially broken away perspective view the needle being retracted so as to fold the end of the tube into itself.

FIG. 3 shows in axial cross-sectional view a completed eyeglass retainer with both ends of the tube folded inwardly.

FIG. 4 shows one end of an eyeglass retainer according to this invention being fitted onto a temple piece of an eyeglass frame.

FIG. 5 shows a pair of eyeglasses retained to the head of the wearer by means of a retainer according to this invention.

DETAILED DESCRIPTION OF THE PREFERRED EMBODIMENT

With reference to the drawings, FIG. 1 shows a tube 10 having a tube wall 12 of knitted fabric which may be made on a small diameter cylinder knitting machine, using, for example, a three-quarter inch cylinder. Fibers suitable for such tubing are Lycra-Spandex manufactured by the DuPont Company, and mixtures of rubberized polyester, polycotton, and cotton yarns. Still other suitable fibers will become apparent to those possessed of ordinary skill in the knitting field.

Small diameter knitting machines are in commercial use, and can produce a so-called "draw cord" which is tubular in cross-section, but comes out from the knitting machine as a flattened ribbon approximately one-quarter inch in width. The tube as illustrated in FIG. 1 is broken away at each end, but it will be understood that the tube wall is continuous between the two ends 14 and has an end opening 16 at each end of the tube.

A conventional commercial knitting needle 20 (also known as a loop turner needle) having a point 22 a rearwardly extending barb or hook 24, and a hinged latch 25 is inserted through the tube wall 12 at a point 26 spaced from one end 14 of the tube 10, the spacing being sufficient to allow insertion of the needle 20 at a shallow angle through the interior of the tube until the point 22 protrudes from the end opening 16. The barb or hook 24 is then hooked onto the edge 26 surrounding the end opening 16. The latch 25 is opened away from the hook 24 and the point of the latch is pushed through the tube wall 12 at a point approximately ⅛ to 1/16 inch inwardly from the edge 16. The latch 25 is then closed against the hook 24, capturing the edge of the tube. The needle 26 is then retracted as suggested by the arrow in FIG. 2 so as to fold the tube wall inwardly upon itself by drawing the edge 16 into the tube as the needle is retracted.

Once a sufficient segment 30 of the tube 10 has been folded and drawn into itself by means of the needle 20, the needle may be again pushed towards the open end of the tube so as to open the latch 25 and disengage the needle from the tube wall. The needle can then be pulled back again and the point extracted from the interior of the tube, the rearward movement keeping the latch 25 against and covering the point of hook 24 so that neither the latch nor the hook engage the fabric as the needle is extracted. This procedure is then repeated at the opposite end of the tube so as to obtain two double walled end portions 28, as shown in FIG. 3.

Turning now to FIG. 3, the result of the aforementioned procedure is a double walled end portion 28 formed by turning a tube segment 30 inwardly. The inner diameter of the segment 28 is somewhat restricted relative to the inner diameter of the intermediate, single walled portion 32 of the eyeglass retainer 50.

By selecting the tube 10 to have an appropriate initial inner diameter, the reduced inner diameter of the double walled end segments will be sized to stretch over and snuggly receive the temple piece 40 of eyeglasses 45 as shown in FIG. 4. While the single walled intermediate portion 32 of the retainer 50 may also stretch to receive portions of the temple piece 45, the double walled end portion 28, because of its greater resistance to stretching, effects greater gripping force than the single walled portion, and thus safeguards against separation of the temple piece 40 from the retainer 50. The end portion 28 is also stiffer and more resistant against the bending required to slide the end portion 28 off the curving rear end of the temple piece 40 typical of most eyeglass frames, which feature further enhances the security of the connection between the retainer 50 and the eyeglass frame.

The infolding of the segment 30 also produces a finished end or edge 34 of substantially smoothly rounded contour, as best appreciated in the cross-section of FIG. 3. Such a finished edge is immune against fraying in normal use of the device, while the unfinished edge 26 is protected within the tube against excessive wear and, in any case, a small amount of fraying of the edge 26 caused by insertion and extraction of the eyeglass temple pieces can be tolerated over a long period of time without impairment to either the esthetics or functionality of the retainer.

The elasticity of the knitted fabric is taken advantage of, not only for purposes of gripping the temple pieces of the eyeglass frame, but also to exert a retaining force on the eyeglasses when the retainer band 50 is placed around the rear of the head of a wearer, as shown in FIG. 5, so that the retainer connects the two temple pieces of the eyeglass frame. The end portions 28 of the retainer may be slid along the temple pieces to adjust the effective length of the retainer band, and thus also adjust the retaining force exerted by the retainer 50, so as to hold the frame in place on the wearer's face and head without excessive force without causing discomfort to the wearer.

It is to be understood that the length of the retainer 50 may be increased so as to make aa retainer which will allow the eyeglasses to dangle from a wearer's neck when not in use, without modification to the structure of the inturned ends 28 or the process of making the same.

It will be appreciated that the present invention enables the manufacture of an eyeglass retainer from nothing more than a length of tubing of suitable material, without necessity of fasteners or adhesives, resulting in an esthetically pleasing, low cost, durable, reliable and easy to attach eyeglass retainer.

While a particular embodiment has been described and illustrated for purposes of clarity, still other changes, modifications and substitutions will be apparent to those possessed of ordinary skill in the art in light of the present disclosure. Thus, the scope of the invention is to be limited only by the following claims.

What is claimed is:

1. An eyeglass retainer headband comprising a substantially continuous tube of pliable textile material having a normal inner diameter between two open ends, a segment of said tube at each said end being turned into said tube to form a double walled end portion of somewhat reduced inner diameter in relation to said normal diameter and increased stiffness for securely gripping the ends of eyeglass frame temple pieces inserted into said folded end portion while also providing a smoothly contoured folded edge around each end opening of the tube.

2. The article of claim 1 wherein said tube is made of an elastic material.

3. The article of claim 2 wherein the wall thickness of said tube is substantial in relation to the internal radius of said tube.

4. The article of claim 1 wherein said tube wall is made of knitted fiber.

5. The article of claim 1 wherein said tube has a continuous tube wall between said two ends.

6. The article of claim 1 wherein said reduced inner diameter is sized to snuggly accept the temple pieces of a pair of eye glasses and the length of said tube is such as to exert elastic retaining force when placed around the head of an eyeglass wearer with the tube connecting the temple pieces of the eyeglasses.

7. The article of claim 1 wherein each said inturned segment is less than two inches long.

8. An eyeglass retainer headband comprising a tube of knitted elastic material having two open ends, said tube having a tube wall of substantial thickness compared to one half the internal tube diameter, a relatively short tube segment at each said end being turned into said tube to form a double walled end portion of somewhat reduced inner diameter and increased stiffness so as to snuggly accept a temple piece of a pair of sunglasses in each end opening while also providing a smoothly contoured edge around each end opening of the tube so as to keep the tube ends from fraying.

9. A method for making a retainer headband for eyeglasses comprising the steps of:
providing a length of continuous tubing having a tube wall made of pliable elastic material and substantially constant normal inner diameter between two open ends; and
turning a segment of said tube wall at each said end into the interior of said tube so as to form end portions of double wall thickness having a somewhat reduced inner diameter in relation to said normal inner diameter and increased stiffness and a smoothly contoured edge about each end opening.

10. The method of claim 9 wherein said step of turning each of said segments comprises the steps of inserting a needle provided with a barb through the tube wall, hooking one end of the tube with said barb and retracting the needle to pull the hooked end into the tube.

11. The method of claim 10 further comprising the step of disengaging said needle from said tube.

12. The method of claim 9 wherein said step of providing comprises the step of knitting a continuous tube of elastic material and cutting said continuous tube into smaller lengths.

13. A method for making a retainer headband for eyeglasses comprising the steps of:
providing a length of tubing having a tube wall made of pliable elastic material and two open ends; and
inserting a needle provided with a barb through the tube wall;
hooking one end of the tube with said barb; and
retracting the needle to pull the hooked end into the tube so as to turn a segment of said tube wall at each said end into the interior of said tube and thereby form end portions of double wall thickness having a somewhat reduced inner diameter and increased stiffness and a smoothly contoured edge about each end opening.

14. A method for making a retainer headband for eyeglasses comprising the steps of:
knitting a length of tubing having a tube wall made of pliable elastic material and two open ends and a normal inner diameter between said open ends; and
turning a segment of said tube wall at each said end into the interior of said tube so as to form end portions of double wall thickness having a somewhat reduced inner diameter in relation to said normal inner diameter and increased stiffness for gripping the ends of eyeglass frame temple pieces inserted therein and a smoothly contoured edge about each end opening to facilitate such insertion.

* * * * *